(12) United States Patent
Levy

(10) Patent No.: US 11,918,146 B1
(45) Date of Patent: Mar. 5, 2024

(54) EASY CLEAN GRILL

(71) Applicant: Peter L. Levy, San Francisco, CA (US)

(72) Inventor: Peter L. Levy, San Francisco, CA (US)

( * ) Notice: Subject to any disclaimer, the term of this patent is extended or adjusted under 35 U.S.C. 154(b) by 0 days.

(21) Appl. No.: 18/212,042

(22) Filed: Jun. 20, 2023

(51) Int. Cl.
*A47J 37/07* (2006.01)

(52) U.S. Cl.
CPC .................. *A47J 37/0786* (2013.01)

(58) Field of Classification Search
CPC .. F23H 2900/17002; F23H 1/04; F23H 13/06; F23H 15/00; F23H 17/02; F24C 15/107
USPC ................................. 126/179, 25 R
See application file for complete search history.

(56) References Cited

U.S. PATENT DOCUMENTS

| | | | | |
|---|---|---|---|---|
| 5,347,978 A * | 9/1994 | Zuran | ................... | A47J 37/067 126/41 R |
| 7,487,717 B2 * | 2/2009 | Lauro | ................. | A47J 37/0694 126/39 M |
| 2003/0029973 A1 * | 2/2003 | Stephen | .............. | A47J 37/0713 248/129 |
| 2011/0011388 A1 * | 1/2011 | Johnston | ............. | A47J 37/0713 99/422 |
| 2012/0216790 A1 * | 8/2012 | Hopkins | ............. | A47J 37/0704 126/25 R |

* cited by examiner

*Primary Examiner* — Ko-Wei Lin
(74) *Attorney, Agent, or Firm* — Walt Froloff

(57) ABSTRACT

A BBQ grill is disclosed having an easy way of disassembly and cleaning Grill rack rod set having terminal ends for coupling with barbeque grill outer frame, the set of rods uniformly spaced on the rack frame to form a grill. Each rod has a hollowed channel and an inclined frame to conduct melting fat to a grill side where it is collected.

12 Claims, 3 Drawing Sheets

EASY CLEAN GRILL

BACKGROUND

Field

The field of the present invention relates generally to the field of outdoor cooking and in particular to simple grills rack disassembly-reassembly for easy cleaning of grill for reuse.

Background of the Invention

The field of outdoor cooking, particularly grilling is well known and very popular being mostly using the conventional outdoor barbecue grill, which is made up of a charcoal container or kettle, a grill and a lid. Commonly, these grills have a cooking rack located above the charcoal holding cavity. Many variations exist as outdoor cooking assemblies of various types have been utilized for many years. A very big problem with this outdoor cooking apparatus is the clean up after use.

The conventional outdoor grill requires continually supervision or monitoring of the food being cooked because grease dripping from the food being heated tend to start flames reaching up to and beyond the food level while cooking. Many conventional grills allow the user to place the food on the rack or grating level cooking surface and close the grill lid. The food then cooks relatively spit fire free and requires less attention until it is ready to be served. By closing the lid to the cooking chamber the food is surrounded and cooked by the diffused heat and smoke minus the periodic flaming. Also by closing the lid and tending to other matters while the food cooks, the exposure to smoke is eliminated or greatly reduced. The exposure to smoke and the smoke smell can irritate eyes and sinuses, trigger allergies and permeate clothing. What is needed is for exposure to be greatly reduced.

In some grill designs the outdoor cooker has a charcoal or gas source of heat and is equipped with parallel louvers between the heat source and the grill grating. The louvers can be moved into upright position, or angled position to provide direct or indirect heating to the food. In either case grease dropping down on the louvers can also spawn flames which are even nearer to the food and can potentially pose a fire hazard or food burning.

Yet another grill design is combined with a fire retarding screen, which is intended to retard flame passage and provide greater heat intensity for cooking foods at a faster rate. It is claimed that the high heat intensity of the screen will cause any grease drippings from the food to be dissipated on contact with the screens. However this flame retarding screen does not diffuse the heat nor elevate the food to the upper portion of the cooking rack. It is questionable whether grease caused flames are reduced. Also the several screens only add to more cleanup work.

In another outdoor grill design, a collapsible multi-level barbecue grill that is readily portable and employs the various features of a grill. Cleaning of this ringed cooker presents another challenge and there is burnt food build up. The cleanup must handle a hard surface to dislodge most food.

What is needed are grills that reduce grease droppings, collect grease droppings and are easier to clean. The current grills, racks and gratings are the scrape, heat and sanitize with heat. What is needed are grills with less uncontrolled flames emitted from grease droppings and easy cleaning racks and gratings.

SUMMARY

The present invention discloses a grill with an assembly-disassembly rack having a set of rods for assembling a grill rack frame for a grill. Each rod with removable coupling at the rod ends for installing and removing the rods on the rack frame at frame coupling separation intervals and each rod having a channel for receiving excess grease and liquids. A rack shim on a grill side for inclining the rack frame provides excess grease and liquids gravity flow towards the opposite side in the rod channel whereby the set of grill rack rods are quickly removable for cleaning and excess fat is drawn to and collected on one side of a grill.

The grill set of rods have spring loaded terminal ends with hooks for coupling to the rack frame at metered rod separation intervals or frame detents at metered intervals coupling rod terminal ends with snaps for coupling each rod to the rack frame at a frame detent site.

BRIEF DESCRIPTION OF DRAWINGS

Specific embodiments of the invention will be described in detail with reference to the following figures.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Objects and Advantages

The easy disassembly grill rack or grill grate is disclosed herein addresses the above needs and concerns in the following manner.

It is, therefore, an object of the invention is to create grills that reduce grease droppings causing flames from the heat source to reach the food.

Another object of the invention is to provide ways to collect grease droppings before they flame up from heat source ignitions.

A still further object of the invention is to provide outdoor grills that are easier to clean.

It is an objective of the invention to provide grills with less uncontrolled flames emitted from grease droppings and easy cleaning racks and gratings.

Another object of the invention is to provide easily removable frame rods which will require no scraping off or hand washing after use.

Yet another object of the invention is to provide renewable rods, rods that can be replaced without replacing or cleaning an entire grill.

The present invention discloses several embodiments for making an assembly-disassembly grill rack for a grill.

Figure 1:
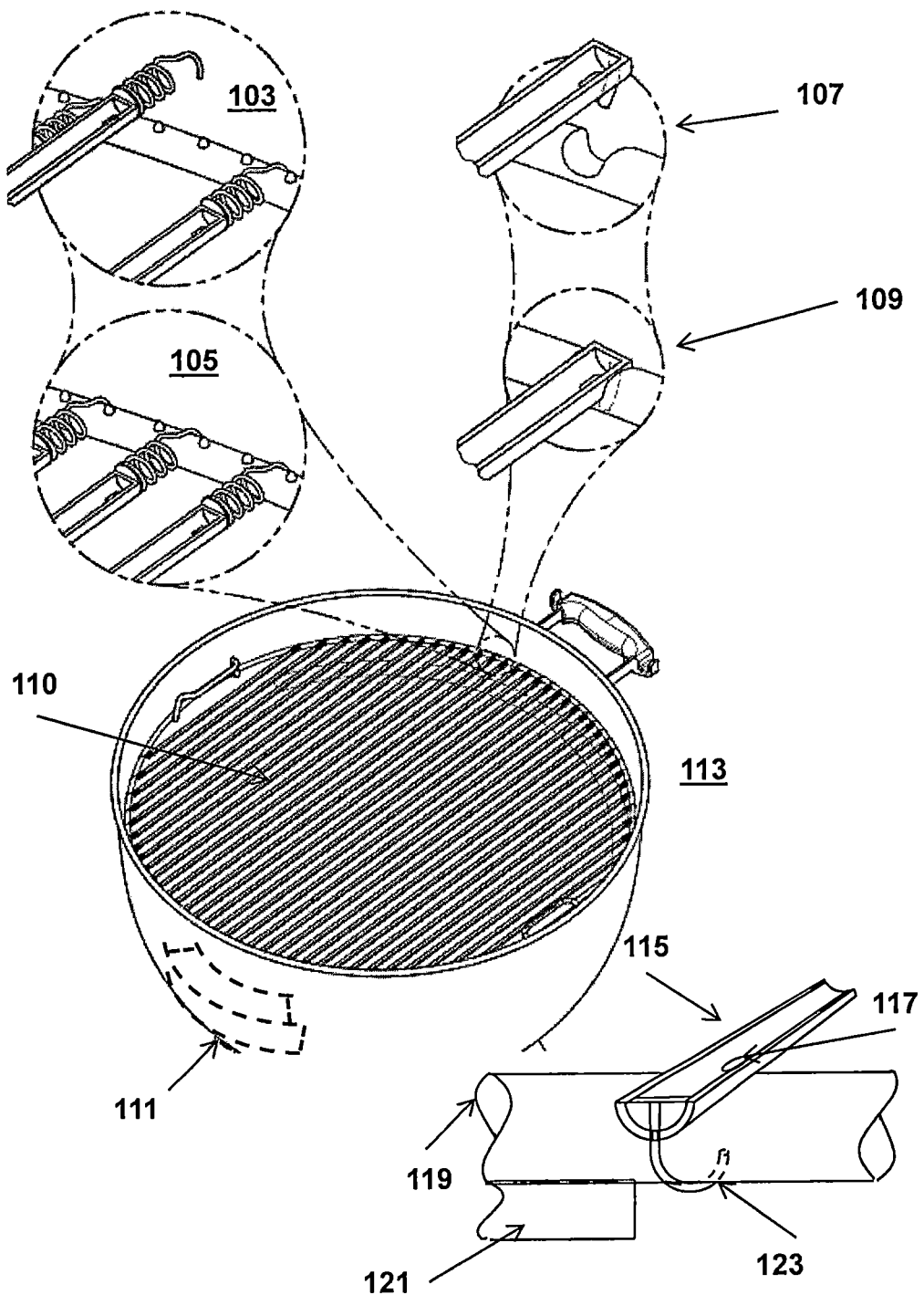
FIG. 1 shows a grill with an assembly-disassembly rack in an embodiment of the invention.

FIG. 1 shows a grill with an assembly-disassembly rack in an embodiment of the invention. In an embodiment of the invention a set of removable rods 115 are assembled into a BBQ grill 113 rack 110 or grill frame 119 having mating slots or detents 107 109 for coupling the set of rods to a cooking rack 110 and grill 113. The rods 103, 105 can have non-stick coating for cooking and made from any material currently used for grill 113 rack 110 including but not limited to iron, steel, heat resistant composites, carbon composites, alloys, metal ceramic alloys. The rod terminal ends 115 are designed for easy attachment and easy removal for cleaning, even in a dishwasher.

In an embodiment a rod 115 may have a cylindrical shape cross-section with an open channel on the up side of the rack longitudinally along the rod 115. In another embodiment the rod 115 may just be U-shaped cross-section longitudinally along the rod 115 with spring clip 123 coupled hook ends 103 105 for coupling with a rack 110 frame 119. The bottom side of a rod 115 has a drain or otherwise opening 117 at each terminal end of the rod 115 to allow the melted grease to leave the rod channel at the terminal end opening 117 and continue to fall along the side of the grill housing 113 to a grease catcher 111 removably coupled to the grill housing. In an embodiment the rack 110 frame 119 can have an riser 121 rigidly attached to the frame 119 to provide the rack 110 with a slight incline.

A grill 113 with an assembly-disassembly rack 110 with a set of rods 110 for assembling a grill rack frame for a grill 113 are shown in an embodiment of the invention. Each rod 115 has removable coupling 123 at the rod ends for installing and removing the rods on the rack 110 at frame 119 coupling separation intervals. Each rod 115 has a channel for receiving excess grease and liquids, and a rack shim or riser 121 on a grill 113 side for inclining the rack frame to provide excess grease and liquids gravity flow towards the opposite side in the rod channel. The set of grill 113 rack 110 rods 115 are quickly removable for cleaning and excess fat is drawn to and collected on one side of a grill.

In an embodiment the rod end couplings 103 105 with spring loaded terminal ends with hooks for coupling to the rack frame are installed at metered rod separation intervals. In another embodiment the rod end couplings 107 109 are inserted into frame detents at metered intervals coupling rod terminal ends with snaps for coupling each rod to the rack frame at a frame detent site.

Figure 2:
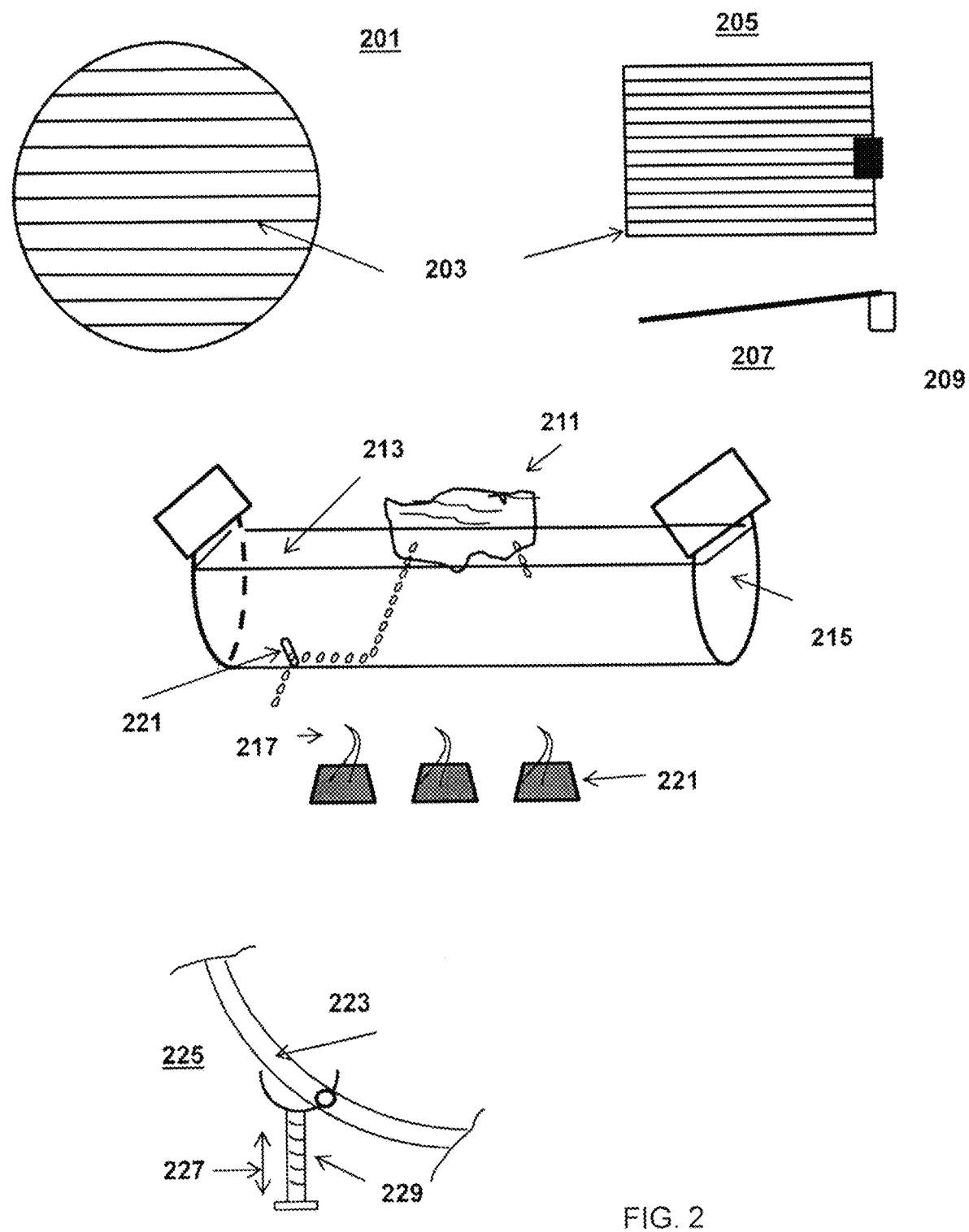
FIG. 2 illustrates a grill with an assembly-disassembly racks and rack inclinators in an embodiment of the invention.

FIG. 2 illustrates a grill with an assembly-disassembly racks and rack inclinators in an embodiment of the invention. An embodiment of the invention grill device catches a major part of the grease flowing into the grill heat source briquettes 221 or gas flames 217 using a set of grill rods 215 which have a slit or open channel 213 along the rod length.

The grill rack or grate side of the grill frame generally rest on a grill housing lip or grill housing support. In an aspect of the invention one side of the grill will have and elevating component 219 shown in a side view of a rack 207, propping one side of the grill rack to produce a small rack angle, perhaps 5-10 degrees, such that grease from the meat 211 will flow to the lower side of the grill rack 203 through the rod drain slot 221 and to the grease catcher under the influence of gravity. A variety of grill rack shapes 201 205 can be used in embodiments to replace the diversity of grill housing shapes currently existing.

Rods 215 can be made out of iron, steel, heat resistant ceramic, carbon fiber or any heat resistant material that can be coated to prevent food sticking. Depending on the shape of the rack frame, the rod set are designed of such a length as to fit and couple with the opposite end of a grill rack or section.

In an aspect of the invention the grill frame elevator mechanism 225 may be an adjustable 227 u-shape bolt 229 propping up a grill rack frame 223 at an appropriate location providing grease run-off by frame inclination.

Figure 3:
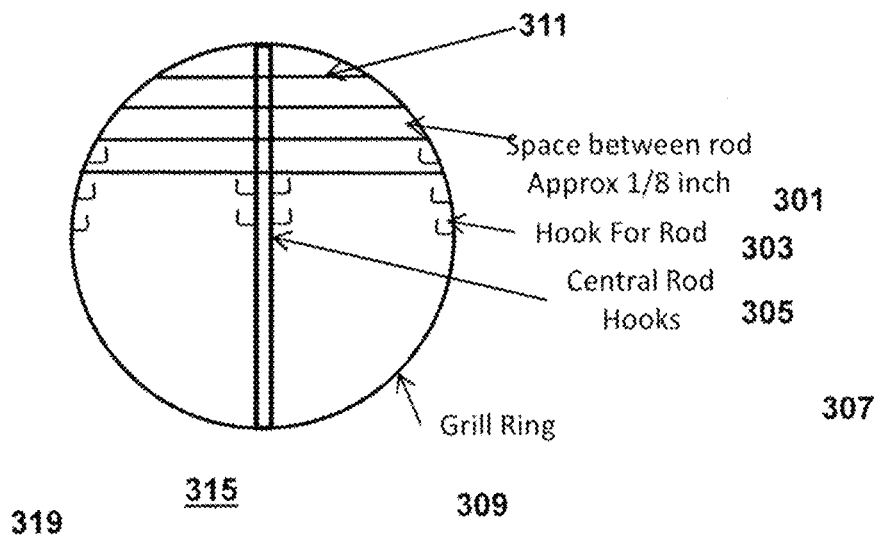
FIG. 3 illustrates a grill with an assembly-disassembly rack and removable grease catcher in an embodiment of the invention.
Figure 3:
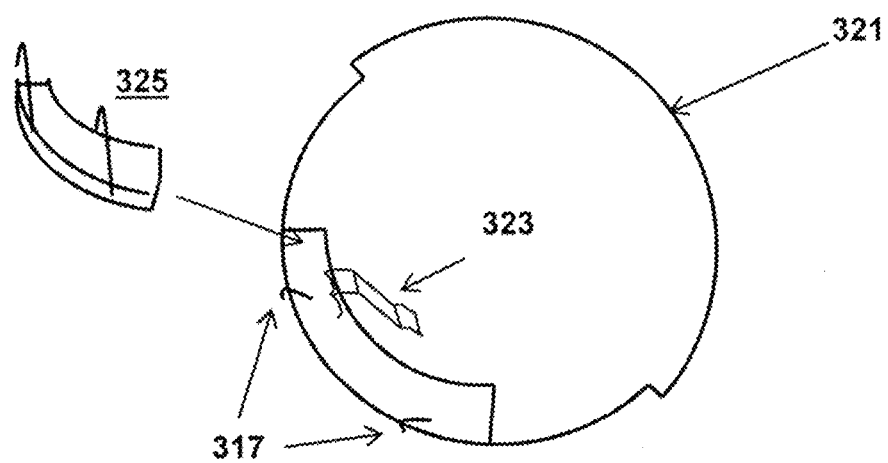

FIG. 3 illustrates a grill with an alternate assembly-disassembly rack and removable grease catcher in an embodiment of the invention. In another embodiment a grill rack will have a midpoint central rod 305 with hooks and with spaced cavities 301 on top of a grill rack frame 309 to allow rod coupling hooks 305 303 to the rack frame 309 for rod set assembly into the rack 315 so that rods are held firmly in place. The rods 311 have channels within a rod facilitate grease runoff. A central stabilizing rod 305 has hook couplings at terminal ends to allow it to be inserted into hook on the side of the grill ring frame 309. The central rod 305 has slots where each cross insertion rod 311 is to be placed, each rod spanning from a point on the grill ring frame 309 to an opposite side frame position and hooked to further stabilize the rod set in the grill rack 315.

In another embodiment, the perimeter of the grill ring are a series of spaced notches, hooks 303 or ring dentations to allow a snap insertion and coupling of each grill rack rod. In an embodiment the grill insertion rod 311 has a top width of 1 inch or more with an interval or space 301 between rods 311 of one ⅛th of an inch or more. Each insertion rod 311 has a channel on top of half of the width of the top of said rod 311. The bottom of each insertion rod 311, is cylindrical in shape and with a hole or opening one half of an inch or more from the rod terminal point. The grill ring frame 309 is a continuous ring around the perimeter of the grill bowl and generally resting or supported by the grill housing. The cylindrical portion of each rod 311 is hollowed-out or U-shaped to allow grease to flow to the terminal end of each rod, depending upon its direction of inclination. All rods are removable so they can be put into a dishwasher.

As an accessory to a removable-insertable rod set rack there is a removable grease gutter 325 below the rack and which can extend to as much as one half of the circumference of the grill housing 321, to catch the grease run off. At any selected point on the gutter there is a detachable container into which the grease is collected and then disposed. In an embodiment the detachable container can have an easy remove tab 323 attached to the detachable container. Centered and above the grease container there is a hole in the gutter to allow the grease flowing from the grill rods to fall into the grease container. The grill rods have a hole at the terminal end of each rod facing the gutter to allow the grease to flow into the gutter. The grill rods are elevated on the opposite side of the gutter at an angle of 5-10 degrees or less to allow the grease flow into the gutter. The grill ring is sufficiently thicker for half of the crescent of the ring opposite the gutter to achieve the desired angle. The ring frame has a series of spikes around the frame into which each grill rod is placed by means of a hole in the rod at each terminal end. The end of each rod is sealed to prevent outflow of grease. The grill rods can be attached to the ring frame by means of a compression spring or clip as shown on previous embodiments, each rod is detachable. At the bottom of the grill tub or body there is a removable half sphere which is screwed on and has "wings" or handles to allow twisting on and off so that the ashes from the Bar-B-Q can be easily removed and then disposed. The gutter 325 to catch the grease can be detachable; in an embodiment of the invention the grease catcher can hook 317 or stick onto the lowered rack side of the grill bowl housing 321.

Therefore, while the invention has been described with respect to a limited number of embodiments, those skilled in the art, having benefit of this invention, will appreciate that other embodiments can be devised which do not depart from the scope of the invention as disclosed herein. Other aspects of the invention will be apparent from the following description and the appended claims.

What is claimed is:

1. A grill with an assembly-disassembly rack comprising:
   a set of rods for assembling a grill rack frame for the grill;
   each rod with removable coupling at the rod ends for installing and removing respective rods on the rack frame at frame coupling separation intervals;
   each rod having a channel for receiving excess grease and liquids, and
   a rack shim on a grill side for inclining the rack frame to provide excess grease and liquids gravity flow towards an opposite side in the channel,
   whereby the set of rods are quickly removable for cleaning and excess fat is drawn to and collected for disposal catch on the opposite side of the grill.

2. The grill with an assembly-disassembly rack as in claim 1 further comprising the set of rods with spring loaded terminal ends with hooks for the removable coupling to the rack frame at rod separation intervals.

3. The grill with an assembly-disassembly rack as in claim 1 further comprising frame detents at intervals coupling rod ends with snaps for coupling each rod to the rack frame.

4. The grill with an assembly-disassembly rack as in claim 1, wherein the rack shim is configured to incline the rack frame to have at least a 5 degree incline.

5. The grill with an assembly-disassembly rack as in claim 1 further comprising a removable grease gutter below the rack frame and which extends to as much as one half of the circumference of a grill housing.

6. The grill with an assembly-disassembly rack as in claim 1 further comprising rods made from material selected from a set of materials including iron, steel, heat resistant composites, carbon composites, alloys, and metal ceramic.

7. A method for a grill with an assembly-disassembly rack comprising the steps of:
   providing a set of rods for assembling a grill rack frame for a the grill;
   providing each rod with removable coupling at the rod ends for installing and removing the respective rods on the rack frame at frame coupling separation intervals;
   having each rod with a channel for receiving excess grease and liquids, and
   adding a rack shim on a grill side for inclining the rack frame to provide excess grease and liquids gravity flow towards an opposite side in the channel,
   whereby the set of rods are quickly removable for cleaning and excess fat is drawn to and collected for disposal catch on the opposite side of the grill.

8. The method for a grill with a assembly-disassembly rack as in claim 7 further comprising the step of providing the set of rods with spring loaded terminal ends with hooks for removable coupling to the rack frame at rod separation intervals.

9. The method for a grill with a assembly-disassembly rack as in claim 7 further comprising the steps of providing frame detents at the rack frame at intervals coupling rod ends with snaps to the rack frame.

10. The method for a grill with a assembly-disassembly rack as in claim 7 further comprising the steps of spacing the set of rods and providing the rack shim for inclining the rack frame to have at least a 5 degree incline.

11. The method for a grill with a assembly-disassembly rack as in claim 7 further comprising the steps of providing a removable grease gutter below the rack frame and which extends to as much as one half of the circumference of a grill housing.

12. The method for a grill with a assembly-disassembly rack as in claim 8 further comprising the steps of having rods made from material selected from a set of materials including iron, steel, heat resistant composites, carbon composites, alloys, and metal ceramic.

* * * * *